United States Patent
Kwon et al.

(10) Patent No.: US 10,714,786 B2
(45) Date of Patent: Jul. 14, 2020

(54) POSITIVE ELECTRODE ACTIVE MATERIAL, METHOD OF MANUFACTURING THE SAME AND ALL-SOLID BATTERY INCLUDING THE SAME

(71) Applicants: HYUNDAI MOTOR COMPANY, Seoul (KR); KIA MOTORS CORPORATION, Seoul (KR); UNIST (ULSAN NATIONAL INSTITUTE OF SCIENCE AND TECHNOLOGY), Ulsan (KR)

(72) Inventors: Oh Min Kwon, Busan (KR); Hong Seok Min, Yongin-si (KR); Yong Sub Yoon, Seoul (KR); Kyung Su Kim, Yongin-si (KR); Yoon Seok Jung, Ulsan (KR); Young Jin Nam, Ulsan (KR); Dae Yang Oh, Ulsan (KR); Sung Hoo Jung, Ulsan (KR)

(73) Assignees: HYUNDAI MOTOR COMPANY, Seoul (KR); KIA MOTORS CORPORATION, Seoul (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 87 days.

(21) Appl. No.: 15/804,722

(22) Filed: Nov. 6, 2017

(65) Prior Publication Data
US 2018/0175440 A1    Jun. 21, 2018

(30) Foreign Application Priority Data
Dec. 19, 2016    (KR) ........................ 10-2016-0173264

(51) Int. Cl.
*H01M 10/052*    (2010.01)
*H01M 4/13*    (2010.01)
(Continued)

(52) U.S. Cl.
CPC ........... *H01M 10/052* (2013.01); *H01M 4/13* (2013.01); *H01M 4/131* (2013.01);
(Continued)

(58) Field of Classification Search
CPC .. H01M 10/052; H01M 10/056; H01M 4/131; H01M 4/525; H01M 4/366;
(Continued)

(56) References Cited

U.S. PATENT DOCUMENTS

| 7,070,632 B1* | 7/2006 | Visco ................. | H01M 2/1686 29/623.3 |
| 2012/0052396 A1* | 3/2012 | Tsuchida ............... | H01M 4/131 429/304 |

(Continued)

FOREIGN PATENT DOCUMENTS

| JP | 2012059541 A | 3/2012 |
| JP | 2014160572 A | 9/2014 |

(Continued)

OTHER PUBLICATIONS

Liu et al. "Enhanced high temperature performance of LiMn2O4 coated with Li3BO3 solid electrolyte." Bull. Mater. Sci., vol. 36, No. 4, Aug. 2013, pp. 687-691 (Year: 2013).*

(Continued)

*Primary Examiner* — Michael L Dignan
(74) *Attorney, Agent, or Firm* — McDonnell Boehnen Hulbert & Berghoff LLP

(57) ABSTRACT

Disclosed are a positive electrode active material capable of suppressing a reaction between a core and a solid electrolyte, a method of manufacturing the same and an all-solid battery including the same.

(Continued)

Provided is a positive electrode active material for all-solid batteries including a core comprising a lithium-containing metal oxide, and a coating layer comprising LiI applied to the surface of the core.

2 Claims, 4 Drawing Sheets

(51) Int. Cl.
    *H01M 4/131*    (2010.01)
    *H01M 4/525*    (2010.01)
    *H01M 4/1391*   (2010.01)
    *H01M 4/62*     (2006.01)
    *H01M 10/056*   (2010.01)
    *H01M 4/36*     (2006.01)

(52) U.S. Cl.
    CPC ......... *H01M 4/1391* (2013.01); *H01M 4/366* (2013.01); *H01M 4/525* (2013.01); *H01M 4/62* (2013.01); *H01M 10/056* (2013.01); *H01M 2300/0065* (2013.01)

(58) Field of Classification Search
    CPC ........ H01M 4/1391; H01M 4/62; H01M 4/13; H01M 2300/0065
    See application file for complete search history.

(56) References Cited

U.S. PATENT DOCUMENTS

2014/0287324 A1* 9/2014 Tsuchida ............... H01M 4/366
                                                    429/304
2015/0024280 A1* 1/2015 Uchiyama ............. H01M 4/366
                                                    429/304

FOREIGN PATENT DOCUMENTS

| JP | 2015005398 A | 8/2015 | |
|---|---|---|---|
| WO | 2010064127 A1 | 6/2010 | |
| WO | WO 2015-151144 | * 10/2015 | ........ H01M 10/0562 |

OTHER PUBLICATIONS

Wu et al. "Lithium Iodide as a Promising Electrolyte Additive for Lithium-Sulfur Batteries: Mechanisms of Performance Enhancement." Adv. Mater. 2015, 27, 101-108 (Year: 2015).*
Ohta et al. "All-solid-state lithium ion battery using garnet-type oxide and Li3BO3 solid electrolyte fabricated by screen-printing." Journal of Power Sources 238 (2013) 53-56. (Year: 2013).*
WO 2015-151144 machine English translation (Year: 2015).*

* cited by examiner

POSITIVE ELECTRODE ACTIVE MATERIAL, METHOD OF MANUFACTURING THE SAME AND ALL-SOLID BATTERY INCLUDING THE SAME

CROSS-REFERENCE TO RELATED APPLICATION

This application claims priority to and benefit of Korean Patent Application No. 10-2016-0173264, filed on Dec. 19, 2016 IN THE KOREAN INTELLECTUAL PROPERTY Office, the disclosure of which is incorporated herein by reference.

BACKGROUND

1. Technical Field

The present disclosure relates to a positive electrode active material, a method of manufacturing the same and an all-solid battery including the same. More particularly, the present disclosure relates to a positive electrode active material capable of suppressing a reaction between a core and a solid electrolyte, a method of manufacturing the same and an all-solid battery including the same.

2. Description of the Related Art

A lithium secondary battery can be used as a power source for a variety of electronic devices from cellular phones, notebooks and small home electronic appliances to vehicles and high-capacity power storage devices and the like, and demand for lithium secondary batteries is thus increasing.

Existing lithium secondary batteries typically use liquid electrolytes containing an organic substance. These liquid electrolytes advantageously have high lithium ion conductivity, but require additional safety features due to the risk of liquid leakage, fire or explosion at high temperatures.

In an attempt to solve the safety problems associated with liquid electrolytes, recently, an all-solid battery using a solid electrolyte has been developed.

A general all-solid battery broadly includes a positive electrode layer, a solid electrolyte layer and a negative electrode layer.

The positive electrode layer includes a positive electrode active material and a solid electrolyte, and further includes a conductive material and a binder.

The solid electrolyte layer includes a solid electrolyte and further includes a polymer.

Like the positive electrode layer, the negative electrode layer includes a negative electrode active material and a solid electrolyte, and further includes a conductive material and a binder.

However, the all-solid battery is problematic in that the positive electrode active material and the solid electrolyte constituting the positive electrode layer are unstable and react with each other to form a new layer, which causes significant deterioration in battery performance.

In an attempt to prevent this problem, research to improve battery performance by coating the surface of the positive electrode active material with a material capable of improving interfacial stability has been continuously underway.

It was found that it is possible to improve interfacial stability, and at the same time, facilitate transport of lithium ions and thus enhance energy density and power characteristics, by coating the surface of the positive electrode active material with $Li_3BO_3$, which is a representative oxide-based solid electrolyte.

However, $Li_3BO_3$ has low ionic conductivity and poor flexibility as compared to sulfide-based solid electrolytes. Accordingly, there is a need for improved positive electrode active materials.

SUMMARY OF THE DISCLOSURE

The present disclosure addresses above problems by providing a positive electrode active material capable of suppressing a reaction between an electrode core and a solid electrolyte, a method of manufacturing the electrode active material and an all-solid battery including the electrode active material.

In accordance with the present disclosure, the above and other objects can be accomplished by providing a positive electrode active material for all-solid batteries that includes a core comprising a lithium-containing metal oxide, and a coating layer comprising LiI applied to the surface of the core.

The core may comprise $LiCoO_2$ and the coating layer may comprise a mixture of $Li_3BO_3$ and LiI.

The coating layer may be present in an amount of from about 0.001 to about 20 wt %, based on the total weight of the core and the coating layer.

The coating layer is preferably present in an amount of from about 0.05 to about 0.1 wt %.

The coating layer may include $Li_3BO_3$ and LiI in a ratio of form about 9:1 to about 8:2 on a mole basis.

The present disclosure also provides a method of manufacturing a positive electrode active material for all-solid batteries including the steps of: preparing a core including metal oxide containing lithium; mixing lithium hydroxide (LiOH), boric acid ($H_3BO_3$), and lithium iodide (LiI) as a coating composition with a solvent to prepare a coating solution; and reacting the coating solution with the core in a wet manner to form a coating layer comprising a mixture of $Li_3BO_3$ and LiI on the surface of the core.

In an alternative embodiment, the core may include $LiCoO_2$.

The process of forming the coating layer may include the steps of: immersing the core in the prepared coating solution; evaporating the solvent from the core-immersed coating solution; and heat-treating the coated core after evaporation of the solvent.

In yet another aspect, the disclosure provides an all-solid battery comprising a positive electrode layer, a solid electrolyte layer, and a negative electrode layer; wherein the positive electrode layer includes a positive electrode active material and a solid electrolyte, and wherein the positive electrode active material includes a core comprising a lithium-containing metal oxide, and a coating layer including LiI and applied to the surface of the core; and wherein the coating layer suppresses a reaction between the core and the solid electrolyte.

In an alternative embodiment, the core may include $LiCoO_2$ and the coating layer may include a mixture of $Li_3BO_3$ and LiI.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to example embodiments, that are illustrated in the accompanying drawings. However, the present disclosure is not limited to these example embodiments and can be implemented in various forms. The embodiments are provided only to illustrate the present disclosure.

Figure 1:
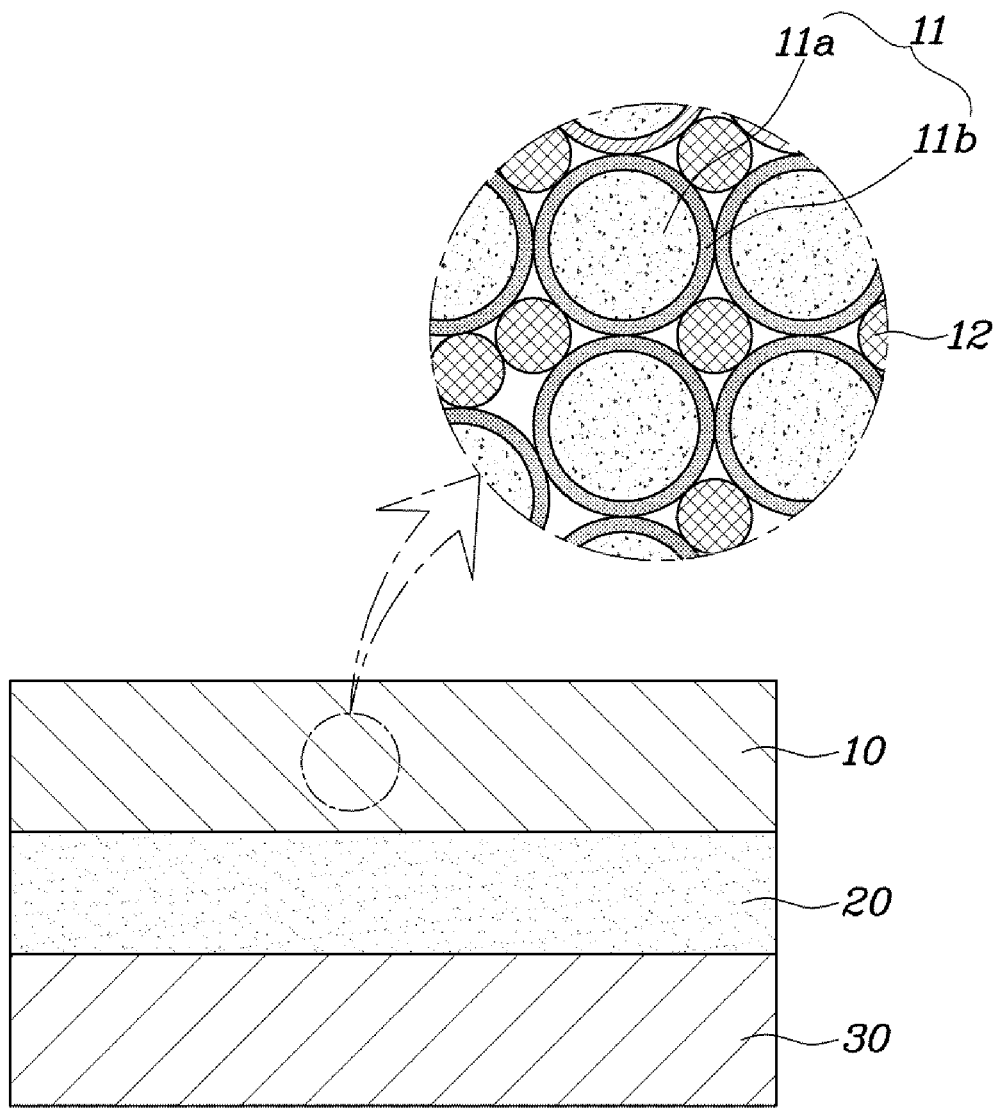
FIG. 1 shows a configuration of a positive electrode active material and an all-solid battery including the same according to an example embodiment.

FIG. 1 shows a configuration of a positive electrode active material according to an example embodiment and of an all-solid battery including the same.

As shown in FIG. 1, the positive electrode active material 11 according to an example embodiment includes a core 11a comprising a lithium-containing metal oxide and a coating layer 11b comprising LiI applied to the surface of core 11a.

Core 11a preferably includes $LiCoO_2$. The material for core 11a is not limited to $LiCoO_2$, however, but may be another material which contains Li and is generally used as a positive electrode active material.

In an example embodiment, coating layer 11b includes a mixture of $Li_3BO_3$ and LiI. The ratio between $Li_3BO_3$ and LiI is preferably from about 9:1 to about 8:2 on a mole basis. When the ratio of $Li_3BO_3$ to LiI is lower than the range defined above, the amount of I (iodine) is excessively low resulting in reduced ionic conductivity and flexibility; and when the ratio of $Li_3BO_3$ to LiI is higher than the specified ranges, battery capacity deteriorates.

The amount of coating layer 11b is preferably from about 0.001 to about 20 wt %, based on the total weight of the core and the coating layer. More preferably, the amount of coating layer 11b is from about 0.05 to about 0.1 wt %. When the amount of coating layer 11b is lower than the range defined above, there is little or no improvement of ionic conductivity and flexibility due to the excessively small amount of coating layer 11b, and when the amount of coating layer 11b is higher than the range defined above, the performance of the positive electrode layer 10 deteriorates due to excessively small amount of the active core material.

Next, a method of manufacturing the positive electrode active material will be described.

The method of manufacturing the positive electrode active material according to an example embodiment broadly includes the steps of: preparing a core 11a, preparing a coating solution, and forming a coating layer 11b on core 11a.

In preparing a core 11a, preferably the core comprises a lithium-containing metal oxide. In an example embodiment, core 11a preferably comprises $LiCoO_2$. However, core 11a is not limited to $LiCoO_2$ but may be a material that contains Li and is generally used as a positive electrode active material, or a mixture thereof.

The step of preparing a coating solution includes mixing a coating composition for improving ionic conductivity and flexibility of the positive electrode active material 11 with a solvent. In an example embodiment, the solvent is distilled water. The solvent is not limited to the distilled water, however, but may be methanol, ethanol, propanol, methyl chloride, THF, etc.

In an example embodiment, the coating solution is prepared by mixing lithium hydroxide (LiOH), boric acid ($H_3BO_3$), or lithium iodide (LiI) as a coating composition with distilled water as a solvent in an appropriate molar ratio.

After core 11a and the coating solution are prepared, the coating solution is reacted with a core in a wet manner to form coating layer 11b comprising a mixture of $Li_3BO_3$ and LiI on the surface of the core. The manner for coating layer 11b is not limited to the wet manner, however, but may be dry milling, vapor deposition method (PLD, ALD, CVD, etc.) and spray coating.

In preparing coating layer 11b, first, core 11a is immersed in the prepared coating solution. As a result, the core reacts with the coating solution. The solvent is then evaporated using a rotary evaporator.

After evaporation of the solvent is completed, the coating composition coated on the surface of the core 11a, is heat-treated. In an example embodiment, heat treatment is performed at a temperature of from about 300 to about 600° C. for 10 hours to form a $Li_3BO_3$—LiI coating layer on the surface of the core, thereby producing positive electrode active material 11. In a preferred embodiment, the heat treatment temperature is about 600° C.

The positive electrode active material 11 described by example above may be incorporated into a positive electrode layer 10 in the manufacture of an all-solid battery.

As shown in FIG. 1, an example embodiment of an all-solid battery includes a positive electrode layer 10, a solid electrolyte layer 20 and a negative electrode layer 30 which are stacked in this order.

Positive electrode layer 10 includes positive electrode active material 11 and a solid electrolyte 12, and further includes a conductive material (not shown) and a binder (not shown). In a further example embodiment, solid electrolyte 12 may be $Li_6PS_4Cl$, which is a sulfide-based solid electrolyte, and the conductive material may be SuperC65.

Solid electrolyte layer 20 includes a solid electrolyte and further includes a polymer. IN an example embodiment, the solid electrolyte constituting solid electrolyte layer 20 may be $Li_6PS_4Cl$, which is a sulfide-based solid electrolyte.

Negative electrode layer 30 includes a negative electrode active material (not shown) and a solid electrolyte (not shown), and further includes a conductive material (not shown) and a binder (not shown). IN an example embodiment, negative electrode active material may be a $Li_{0.5}I$ powder.

In a preferred embodiment, positive electrode layer 10, solid electrolyte layer 20 and negative electrode layer 30 are pelletized by pressing to stack the positive electrode layer 10 and the negative electrode layer 30 such that the solid electrolyte layer 20 is interposed therebetween.

Below, the performance of all-solid battery samples produced according to Comparative Example and Example is described.

The samples of Comparative Example and Example were manufactured in accordance with the methods of producing the positive electrode active material and the all-solid battery described above. In these tests, the variation of capacity of the samples produced based on changes in heat treatment temperature, the amount of the coating layer and the amount of LiI in each sample were measured.

The capacity of the produced samples was measured while sequentially changing the C-rate, based on 1 C=161 mA/g, in an order of 0.2 C-rate, 0.5 C-rate, 1 C-rate, 2.0 C-rate, 5.0 C-rate and 0.2 C-rate, and the number of cycles in an order of 2 cycles, 5 cycles, 5 cycles, 5 cycles, 5 cycles and 35 cycles. In these tests, the voltage was limited from 3.0V to 4.3V compared to Li.

Figure 2:
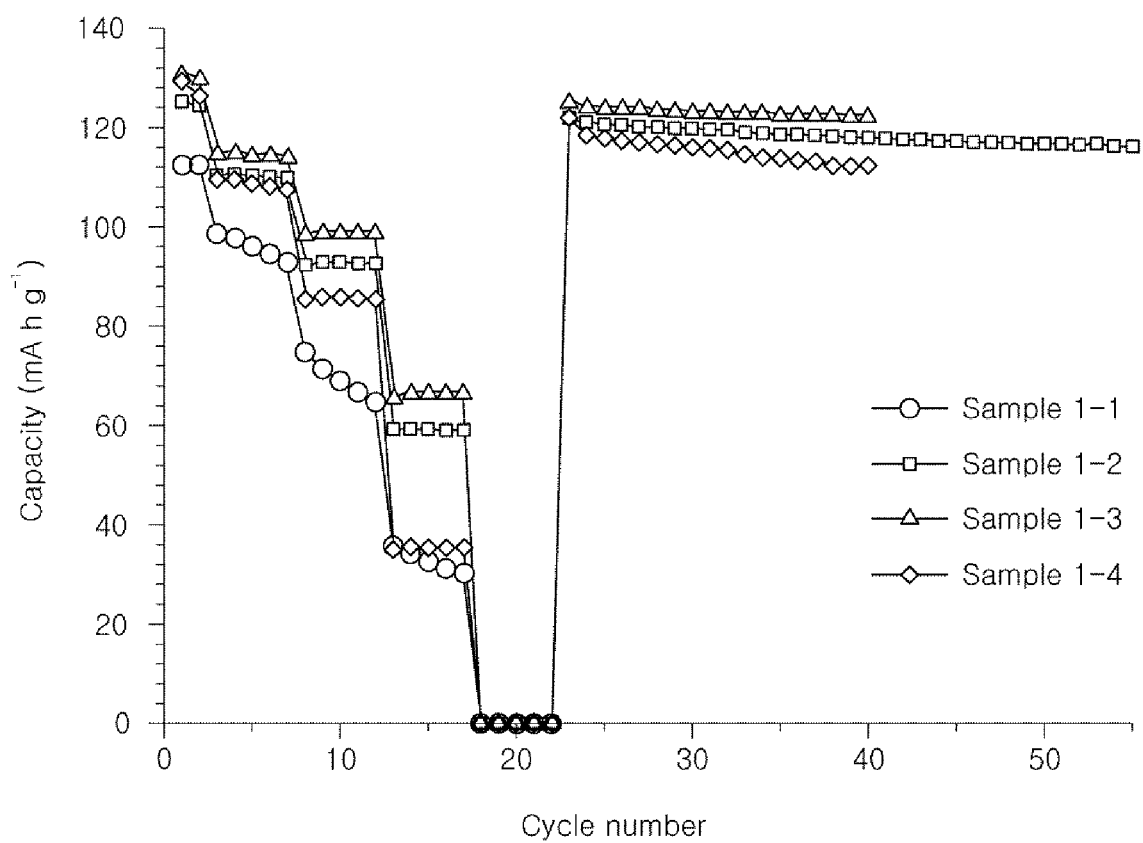
FIGS. 2 to 4 are graphs showing characteristics of all-solid batteries according to Comparative Example and Example.

FIG. 2 illustrates capacity variation as a function of heat treatment temperature conditions.

Sample 1-1 was heat-treated at a temperature of 300° C., Sample 1-2 was heat-treated at a temperature of 450° C., Sample 1-3 was heat-treated at a temperature of 600° C., and Sample 1-4 was heat-treated at a temperature of 700° C.

As can be seen from FIG. 2, Samples 1-1 to 1-3 heat-treated at a temperature of 300 to 600° C. exhibited higher overall capacity in a low-rate charge/discharge area and a high-rate charge/discharge area than sample 1-4 heat-treated at a temperature of 700° C. In particular, sample 1-3 heat-treated at a temperature of 600° C. exhibited the highest capacity in the low-rate charge/discharge area and the high-rate charge/discharge area.

Figure 3:
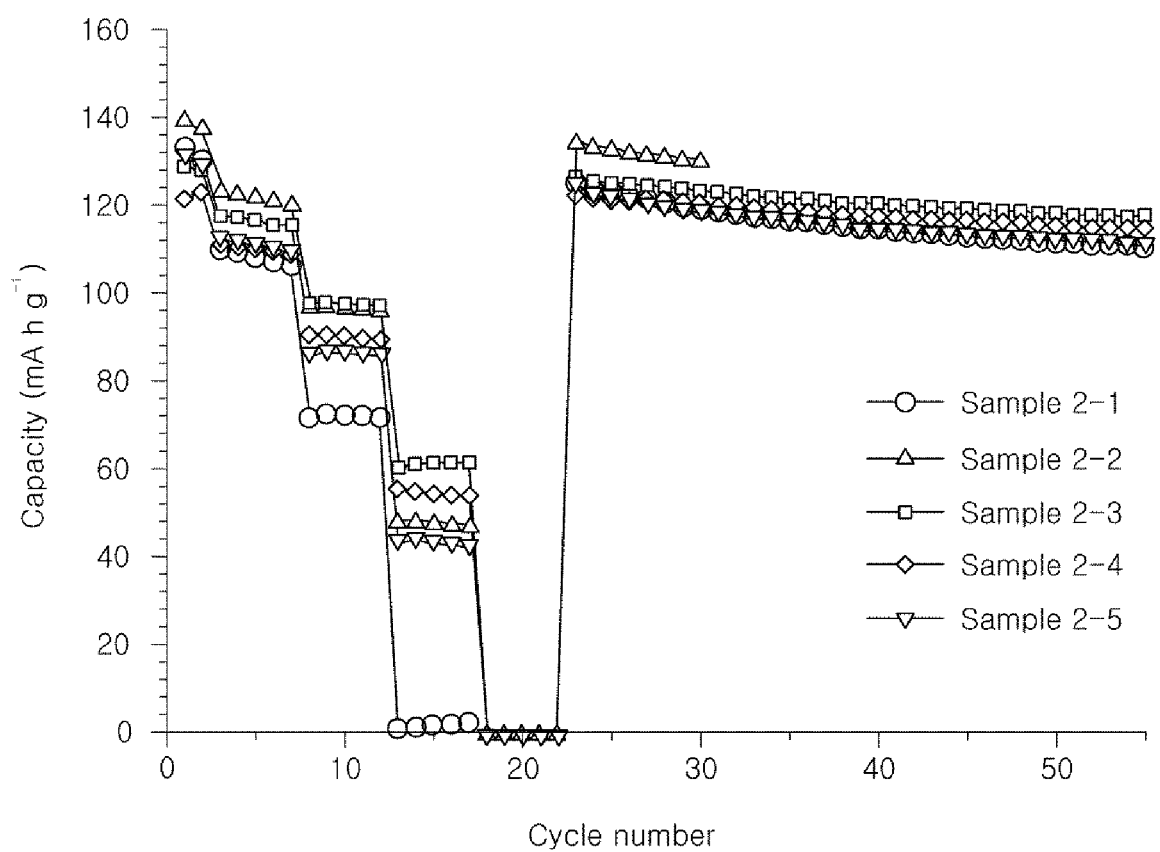

FIG. 3 illustrates capacity variation as a function of the amount of coating layer coated.

Sample 2-1 included no coating layer on the core, Sample 2-2 included a coating layer coated in an amount of 0.05 wt % on the core, Sample 2-3 included a coating layer coated in an amount of 0.1 wt % on the core, Sample 2-4 included a coating layer coated in an amount of 0.2 wt % on the core, and Sample 2-5 included a coating layer coated in an amount of 0.5 wt % on the core.

As can be seen from FIG. 3, Samples 2-2 to 2-5 including coating layers formed on the core in amounts between 0.05 wt % to 0.5 wt % exhibited higher overall capacity in a low-rate charge/discharge area and a high-rate charge/discharge area than Sample 2-1 including no coating layer on the core. In particular, Sample 2-2 including a coating layer coated in an amount of 0.05 wt % on the core exhibited a high capacity in the low-rate charge/discharge area, while Sample 2-3 including a coating layer coated in an amount of 0.1 wt % on the core exhibited a high capacity in a high-rate charge/discharge area. Accordingly, the amount of the coating layer is most preferably maintained at from about 0.05 to about 0.1 wt % in terms of the low-rate charge/discharge area and the high-rate charge/discharge area.

Figure 4:
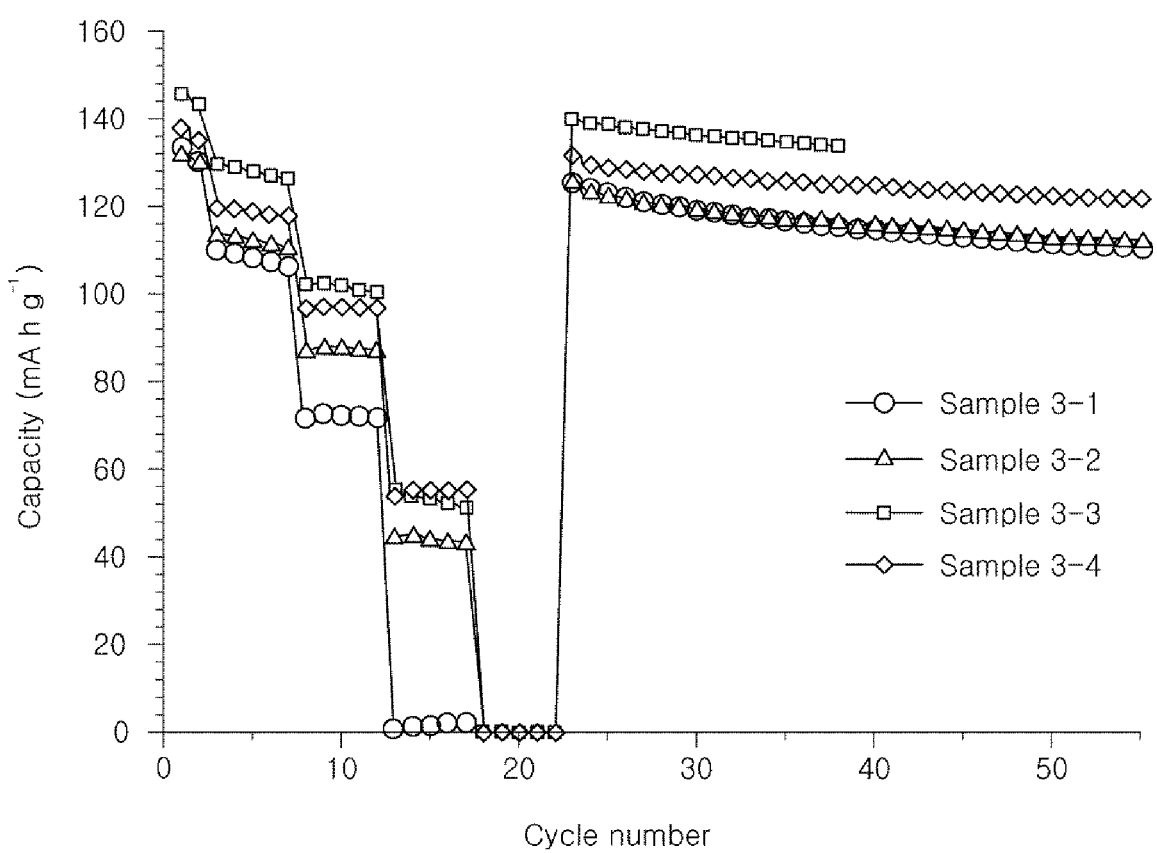

FIG. 4 illustrates capacity variation as a function of the amount of LiI added to the coating layer.

Sample 3-1 included no coating layer on the core; Sample 3-2 included only $Li_3BO_3$ coated on the coating layer, without LiI; Sample 3-3 included both $Li_3BO_3$ and LiI coated in a molar ratio of 9:1 on the coating layer; and Sample 3-4 included $Li_3BO_3$ and LiI coated in a molar ratio of 8:2 on the coating layer.

As can be seen from FIG. 4, Samples 3-1 to 3-3 including the coating layer formed on the core exhibited higher overall capacity in a low-rate charge/discharge area and a high-rate charge/discharge area, than Sample 3-1 including no coating layer on the core.

Samples 3-3 and 3-4 including both $Li_3BO_3$ and LiI coated in molar ratios of 9:1 and 8:2, respectively, on the coating layer exhibited higher capacity in the low-rate charge/discharge area and the high-rate charge/discharge area than sample 3-2 including $Li_3BO_3$ alone coated on the coating layer, without LiI.

The results of FIG. 4 show that, a coating layer using both $Li_3BO_3$ and LiI results in higher capacity than when not forming a coating layer, or when forming a coating layer using $Li_3BO_3$ alone.

According to an example embodiment, the ionic conductivity of the positive electrode active material can be improved by coating the surface of the core with $Li_3BO_3$ as well as LiI including iodine (I) having a large ion size.

In addition, by adding to LiI to $Li_3BO_3$, micro structures can be changed and flexibility can thus be improved.

Although example embodiments have been disclosed for illustrative purposes, those skilled in the art will appreciate that various modifications, additions and substitutions are possible, without departing from the scope and spirit of the invention as disclosed in the accompanying claims.

What is claimed is:

1. A positive electrode active material for all-solid batteries comprising:
   a core comprising a lithium-containing metal oxide; and
   a coating layer comprising LiI applied to the surface of the core;
   wherein the core comprises $LiCoO_2$ and the coating layer consists of a mixture of $Li_3BO_3$ and LiI;
   wherein the coating layer is present from an amount of from 0.05 to 0.1 wt %, and the coating layer comprises $Li_3BO_3$ and LiI in a ratio of 9:1 to 8:2 on a mole basis.

2. An all-solid battery comprising:
   a positive electrode layer comprising a positive electrode active material and a first solid electrolyte;
   a solid electrolyte layer comprising a second solid electrolyte; and
   a negative electrode layer,
   wherein the positive electrode active material comprises:
   a core comprising lithium-containing metal oxide; and
   a coating layer comprising LiI applied to the surface of the core;
   wherein the core comprises $LiCoO_2$ and the coating layer consists of a mixture of $Li_3BO_3$ and LiI;
   wherein the coating layer is present from an amount of from 0.05 to 0.1 wt %, and the coating layer comprises $Li_3BO_3$ and LiI in a ratio of 9:1 to 8:2 on a mole basis.

* * * * *